United States Patent [19]

Pittet et al.

[11] Patent Number: 4,571,344

[45] Date of Patent: Feb. 18, 1986

[54] FLAVORING WITH DITHIOETHERS OF 2-PHENYL-2-ALKENALS

[75] Inventors: Alan O. Pittet, Atlantic Highlands; Ranya Muralidhara, Fair Haven; Kevin P. Miller, Middletown; Domenick Luccarelli, Jr., Neptune, all of N.J.

[73] Assignee: International Flavors & Fragrances Inc., New York, N.Y.

[21] Appl. No.: 726,352

[22] Filed: Apr. 23, 1985

[51] Int. Cl.⁴ .................... A23L 1/226; A23L 1/235
[52] U.S. Cl. .................................. 426/535; 568/57
[58] Field of Search ................... 426/535; 568/57

[56] References Cited

U.S. PATENT DOCUMENTS

| | | | |
|---|---|---|---|
| 4,464,408 | 8/1984 | Pittet et al. | 426/535 |
| 4,481,224 | 11/1984 | Muralidhara et al. | 426/535 |
| 4,493,852 | 1/1985 | Zanno et al. | 426/535 |
| 4,504,508 | 3/1985 | Pittet et al. | 568/57 X |

*Primary Examiner*—Joseph Golian
*Attorney, Agent, or Firm*—Arthur L. Liberman

[57] ABSTRACT

Described are dithioethers of 2-phenyl-2-alkenals defined according to the generic structure:

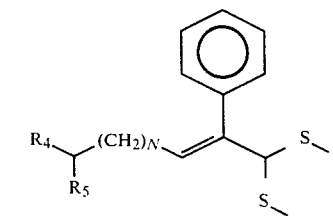

wherein N represents 0 or 1 and $R_4$ and $R_5$ each represents hydrogen or methyl taken alone or taken further together with dithioethers of 2-phenyl-2-alkenals defined according to the structure:

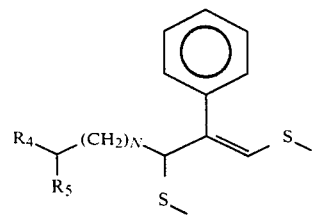

wherein N and $R_4$ and $R_5$ are defined, supra and uses thereof in augmenting or enhancing the aroma or taste of foodstuffs, chewing gums, toothpastes and medicinal products.

3 Claims, 6 Drawing Figures

GLC PROFILE FOR EXAMPLE I.
CRUDE

NMR SPECTRUM FOR EXAMPLE II.

NMR SPECTRUM FOR EXAMPLE III.

NMR SPECTRUM FOR EXAMPLE III

FLAVORING WITH DITHIOETHERS OF 2-PHENYL-2-ALKENALS

BACKGROUND OF THE INVENTION

This invention provides dithioethers of 2-phenyl-2-alkenals defined according to the structure:

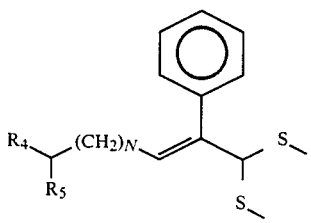

wherein N represents 0 or 1 and each of $R_4$ and $R_5$ represent hydrogen or methyl taken alone or taken in admixture with compounds defined according to the structure:

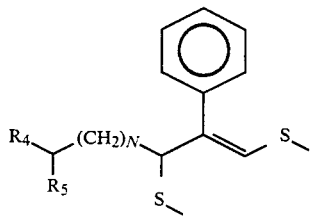

wherein N, $R_4$ and $R_5$ are defined, supra and uses thereof in augmenting or enhancing the aroma or taste of foodstuffs, chewing gums, toothpastes and medicinal products.

Artificial flavoring agents for foodstuffs have received increasing attention in recent years. In many areas, such food flavoring agents are preferred over natural flavoring agents at least in part because of the uniform flavor that may be so obtained. For example, natural food flavoring agents such as extracts, essences, concentrates and the like are often subject to wide variation due to changes in the quality, type and treatment of the raw materials. Such variations can be reflected in the end product and result in unreliable flavor characteristics and uncertainty as to consumer acceptance and cost. Additionally, the presence of the natural product in the ultimate food may be undesirable because of the increased tendency to spoil. This is particularly troublesome in convenience and snack food usage where such products as dips, soups, chips, prepared dinners, canned foods, sauces, gravies and the like are apt to be stored by the consumer for some time prior to use.

The fundamental problem in preparing artificial flavoring agents is that of achieving as nearly as possible a true flavor reproduction. This generally proves to be a difficult task since the mechanism for flavoring development in many foods is not understood. This is notable in products having sauted onion, garlic and hydrolyzed vegetable protein-like flavors.

Reproduction of black cherry, grape, tropical fruit, sauted onion, garlic, cocoa, cabbage and hydrolyzed vegetable protein-like aroma and taste nuances for use in augmenting or enhancing the aroma or taste of foodstuffs, chewing gums, toothpastes and/or medicinal products has been the subject of a long and continuous search by those engaged in the production of foodstuffs, chewing gums, toothpastes and medicinal products. The severe shortage of foods, world-wide especially proteinaceous foods in many parts of the world has given rise to the need for utilizing non-meat sources for proteins and making such proteins as palatable and as meat-like as possible. Hence, materials which will closely simulate or exactly reproduce flavor and aromas of meat-like substances including hydrolyzed vegetable protein-like, and sauted onion-like flavors are required. Furthermore, meat flavors have been previously enhanced by the use of such materials as monosodium glutamate. In many diets, sodium is not desired. In many other diets, monosodium glutamate is not desired. Therefore a need has arisen for a monosodium glutamate replacer.

In general, a need exists for the preparation of black cherry, grape, tropical fruit, sauted onion, garlic, cocoa, cabbage-like and hydrolyzed vegetable protein-like aroma and taste nuances for black cherry, grape, tropical fruit, sauted onion, spice, garlic, vegetable and hydrolyzed vegetable protein flavored foodstuffs, chewing gums, toothpastes and medicinal products.

Dialkyl mercaptals are known in the prior art for augmenting or enhancing the aroma or taste of foodstuffs, chewing gums, toothpastes and medicinal products.

Thus, U.S. Pat. No. 4,481,224 issued on Nov. 6, 1984 discloses alkylthioalkanal dialkyl mercaptals defined according to the structure:

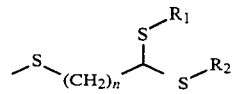

wherein n is an integer of from 1 up to 3; and wherein $R_1$ and $R_2$ are the same or different $C_1$–$C_3$ alkyl. It is disclosed in U.S. Pat. No. 4,481,224 that such dialkyl mercaptals are useful in augmenting or enhancing the aroma or taste of various fruit, vegetable, cheese, tuna fish and hydrolyzed vegetable protein-like flavors.

2-(2,6-dimethyl-1,5-heptadienyl)-1,3-dithiolanes defined according to the generic structure:

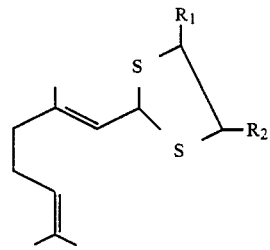

wherein $R_1$ and $R_2$ are the same or different and each represents methyl or hydrogen with the proviso that at least one of $R_1$ and $R_2$ is methyl is disclosed for its uses in augmenting or enhancing the aroma or taste of foodstuffs in U.S. Pat. No. 4,464,408 issued on Aug. 7, 1984. Such 2-(2,6-dimethyl-1,5-heptadienyl)-1,3-dithiolanes are disclosed in U.S. Pat. No. 4,464,408 to augment or enhance the aroma or taste of cooked liver, liverwurst and rare liver flavored foodstuffs.

Acetals of phenyl alkenals are disclosed for augmenting or enhancing the aroma or taste of foodstuffs, chewing gums, toothpastes and medicinal products in the prior art, particularly in U.S. Pat. No. 3,908,023. Thus, U.S. Pat. No. 3,908,023 issued on Sept. 25, 1975 discloses the use of the genus of compounds defined according to the structure:

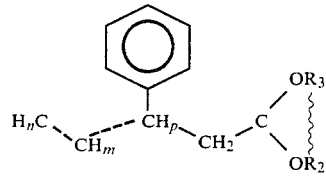

for augmenting or enhancing the aroma or taste of foodstuffs particularly chocolate and cinnamon flavored foodstuffs (wherein one of the dashed lines is a carbon-carbon double bond and the other of the dashed lines is a carbon-carbon single bond; wherein $R_2$ and $R_3$ each represents methyl or ethyl; or $R_2$ and $R_3$ taken together represents ethylene; wherein when the dashed line at the "4,5" position is a double bond n is 2, m is 1 and p is 1; wherein when the dashed line at the "3,4" position is a double bond, n is 3, m is 1 and p is 0.

Specific examples of compounds falling within the structure of U.S. Pat. No. 3,908,023 are as follows:

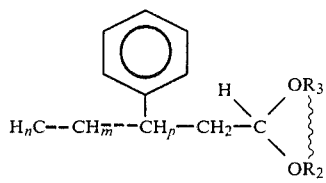

3-Phenyl pentenals have been suggested in U.S. Pat. No. 3,694,232 for use in cocoa flavors whereby notes characteristic of milk chocolate are provided. 3-Phenyl-4-pentenal is indicated to cause the chocolate beverage to have a fuller, richer sweet milk chocolate flavor. U.S. Pat. No. 3,582,360 issued on June 1, 1971 discloses certain 2-phenyl-2-alkenals (the dithio acetals for which are part of the instant invention) as being useful for preparing flavoring compositions and food compositions, particularly those having chocolate or cocoa flavors and/or aroma qualities. Thus, for example, the compound 5-methyl-2-phenyl-2-hexenal having the structure:

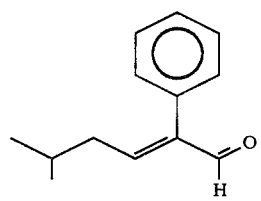

is indicated therein to alter imitation cocoa flavor so as to provide a more natural cocoa flavor and impart the character of bitter chocolate. Other phenyl alkenals disclosed for use in chocolate flavors in U.S. Pat. No. 3,582,360 are those having the structures:

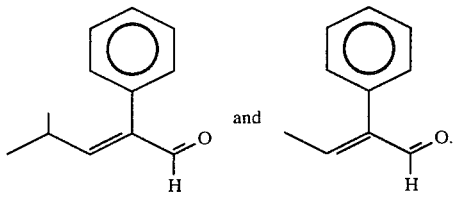

Cinnamaldehyde diethyl acetal is reported in "Perfume and Flavor Chemicals (Aroma Chemicals)" by S. Arctander (published in 1969) as having a "faint but fresh, green, slightly spicy, oily, sweet odor and a mild and oily sweet taste". Arctander goes on to state: "since this acetal-like most other acetals-is unstable under mildly acid conditions, it finds little if any use in flavor compositions".

The dithioethers of 2-phenyl-2-alkenals of our invention have unexpected, unobvious and advantageous properties in augmenting or enhancing the aroma or taste of foodstuffs, chewing gums, toothpastes and medicinal products compared to the relevant compounds of the prior art.

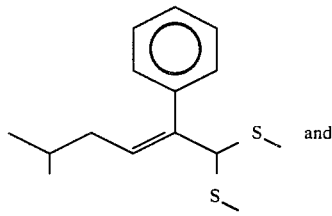

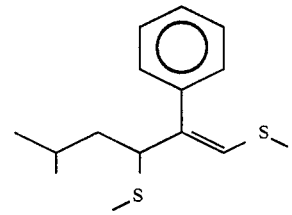

(Conditions: SE-30 column programmed at 100°-220° C. at 8° C. per minute).

Figure 2:
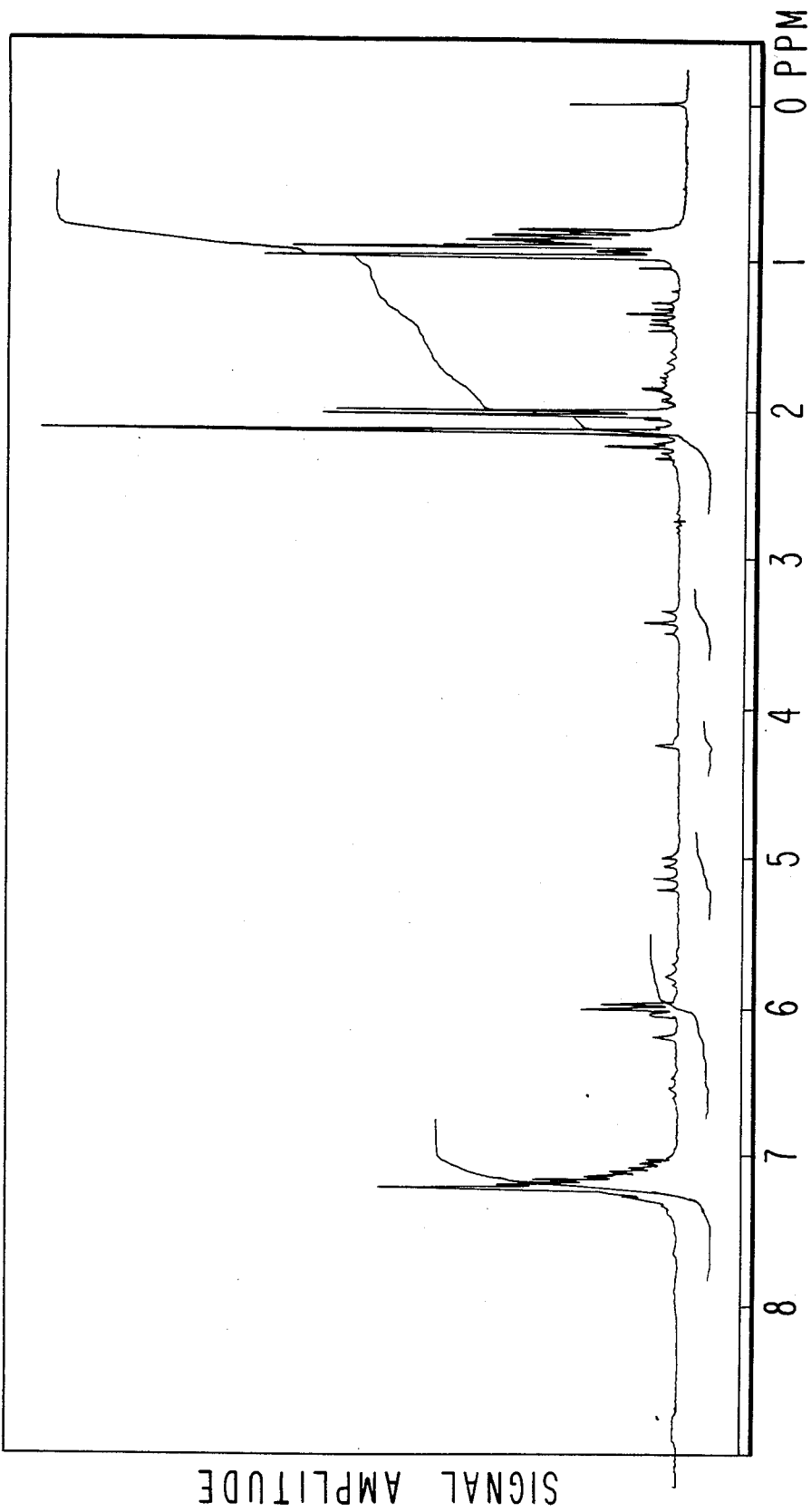

FIG. 2 is the NMR spectrum for the reaction product of Example I containing the compounds having the structures:

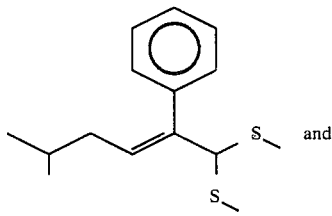

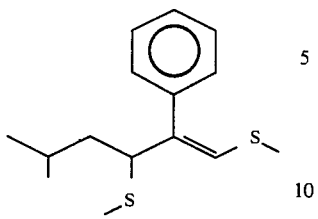

(Conditions: Field Strength: 100 MHz; Solvent: CFCl₃).

Figure 3:
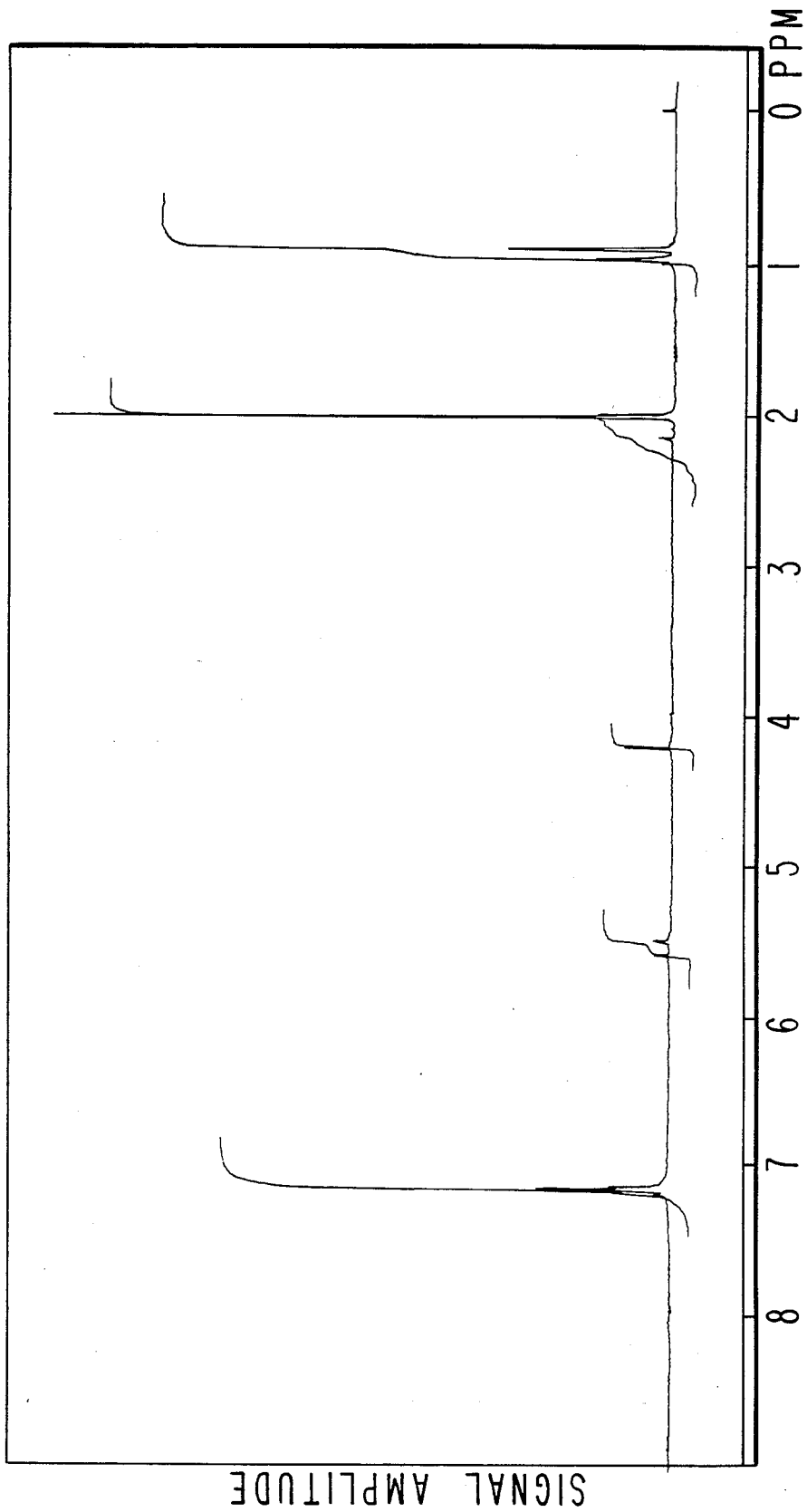

FIG. 3 is the NMR spectrum for the compound produced according to Example II (after GLC trapping) having the structure:

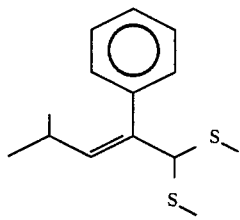

(Conditions: Field strength: 100 MHz; Solvent: CFCl₃).

Figure 4:
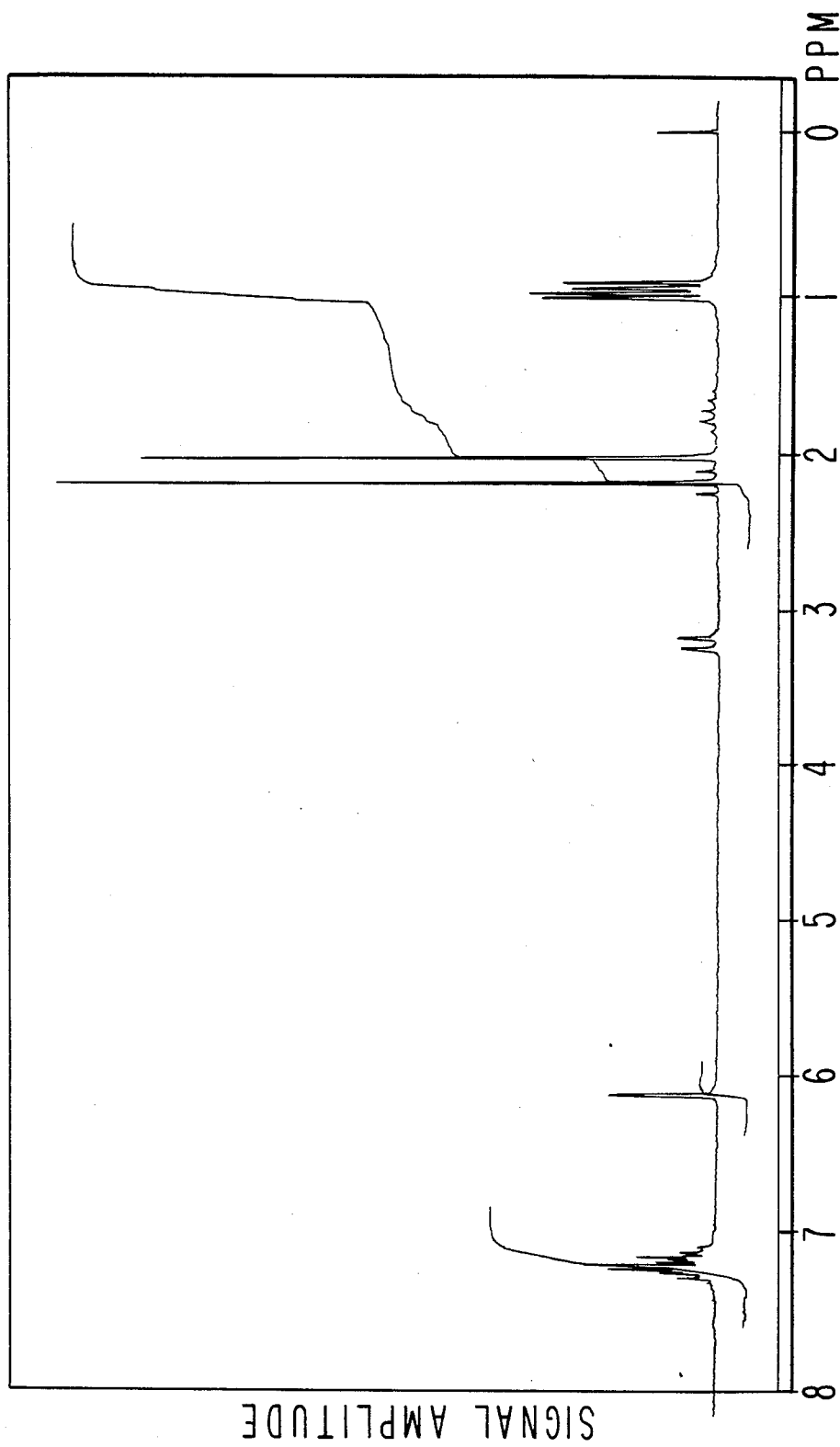

FIG. 4 is the NMR spectrum for the GLC trapping of the compound having the structure:

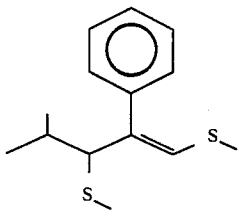

produced according to Example II (Conditions: Field strength: 100 MHz; Solvent: CFCl₃).

Figure 5:
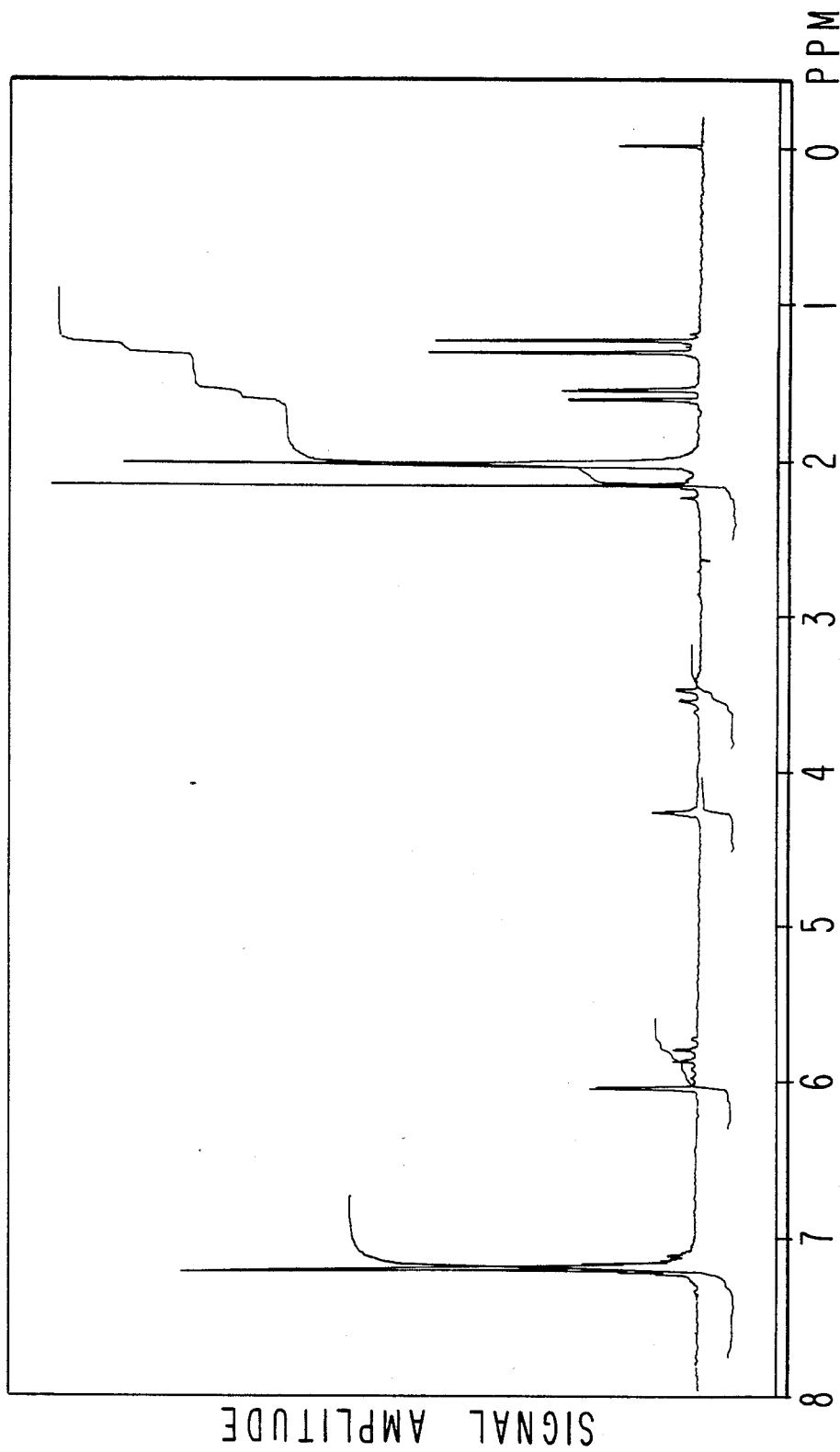

FIG. 5 is the NMR spectrum for the GLC trapping of Example III of the compound having the structure:

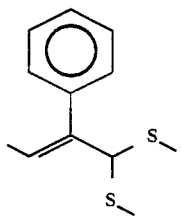

(Conditions: Field strength: 100 MHz; Solvent: CFCl₃).

Figure 6:
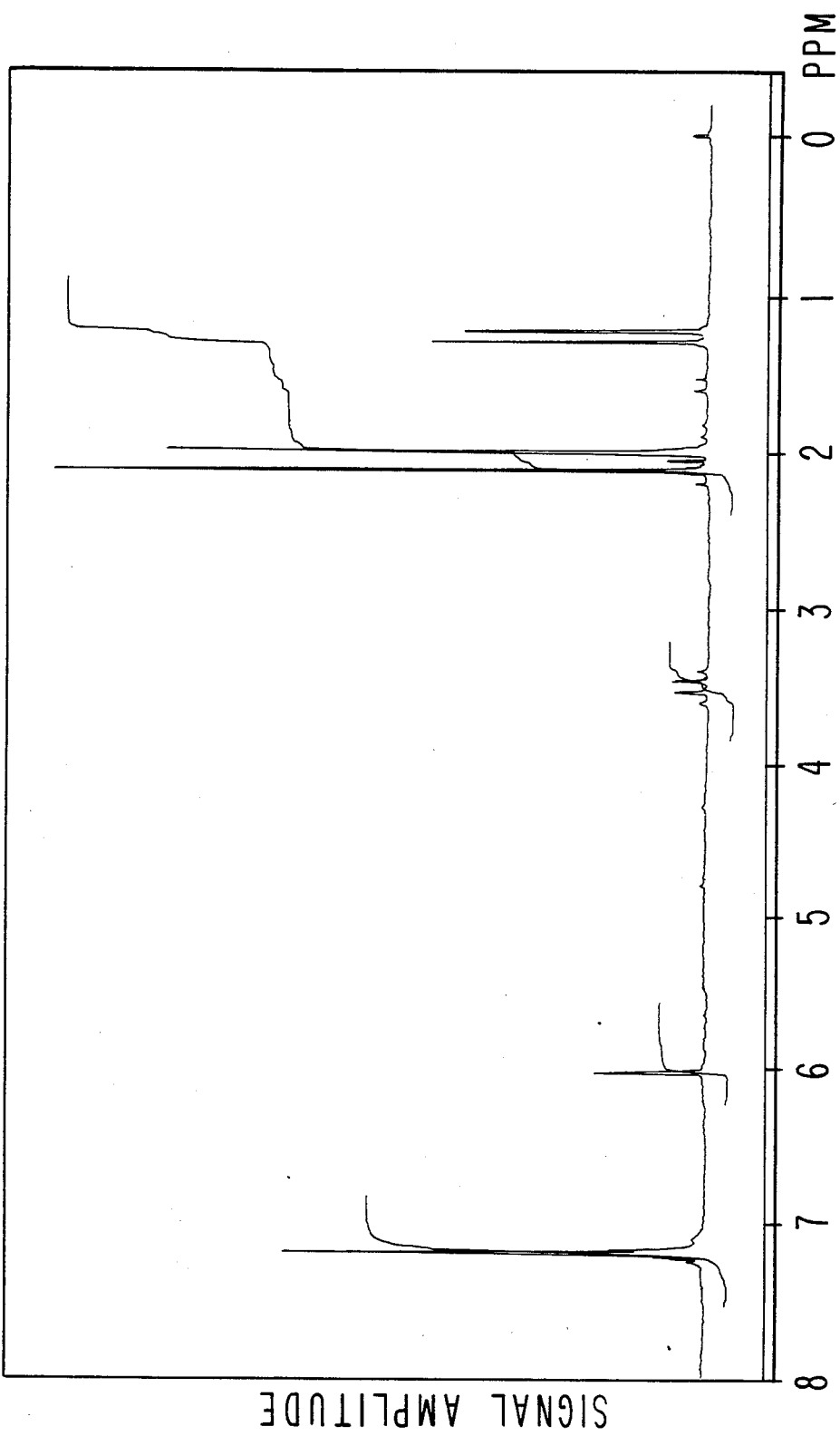

FIG. 6 is the NMR spectrum for the GLC trapping of the compound having the structure:

prepared according to Example III (Conditions: Field strength: 100 MHz; Solvent: CFCl₃).

DETAILED DESCRIPTION OF THE DRAWINGS

Figure 1:
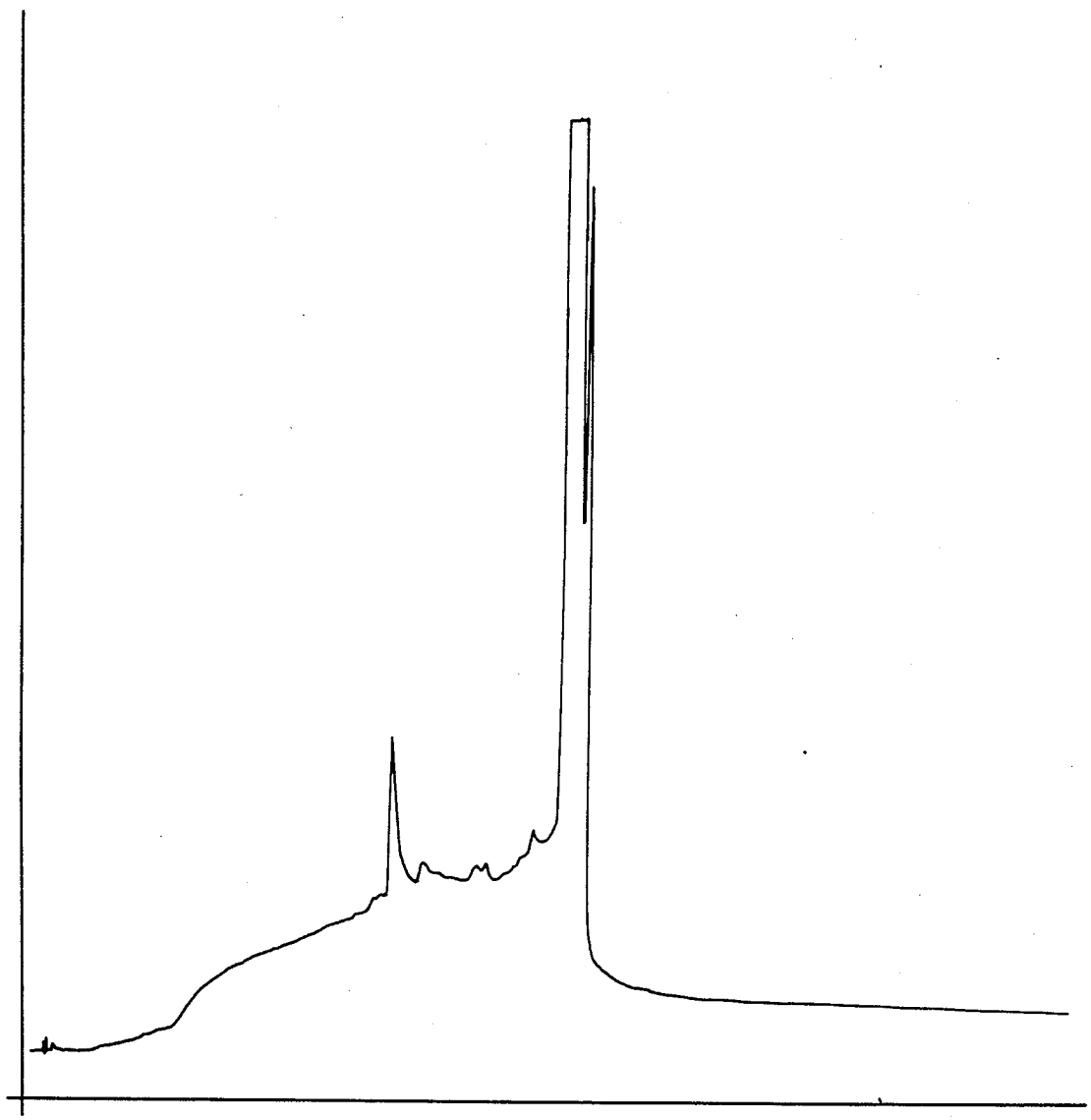
FIG. 1 is the GLC profile for the crude reaction product produced according to Example I containing the compounds having the structures.

FIG. 1 is the GLC profile for the crude reaction product of Example I after all of the solvent is distilled out of the reaction mass starting from 10° C. at 200 mm/Hg. pressure up to 60° C. at 3-8 mm/Hg. pressure.

THE INVENTION

The present invention provides the novel dithioethers of 2-phenyl-2-alkenals defined according to the generic structure:

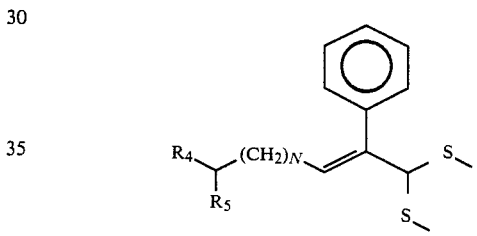

wherein N is 0 or 1 and each of $R_4$ and $R_5$ represents hydrogen or methyl taken alone or taken further together in admixture with a compound defined according to the genus:

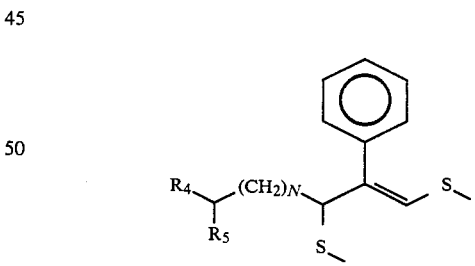

wherein N represents 0 or 1 and $R_4$ and $R_5$ each represent hydrogen or methyl and organoleptic uses thereof for imparting, augmenting or enhancing various black cherry, grape, tropical fruit, sauted onion, garlic, cocoa, cabbage-like and hydrolyzed vegetable protein-like flavors in or to consumable materials including foodstuffs, chewing gums, medicinal products and toothpastes.

Briefly, the methods of the present invention contemplate the addition of the compounds defined according to the genus:

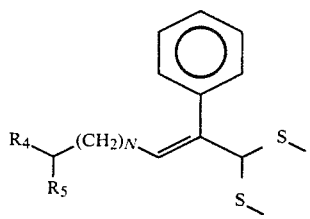

wherein N represents 0 or 1 and each of $R_4$ and $R_5$ represents hydrogen or methyl taken alone or taken in combination with members of the genus defined according to the structure:

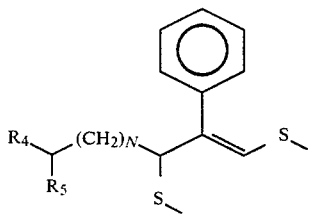

wherein N represents 0 or 1 and $R_4$ and $R_5$ each represent hydrogen or methyl to consumable materials, in amounts sufficient to alter, augment or enhance the organoleptic properties of the consumable materials.

The dithioethers of 2-phenyl-2-alkenals of our invention augment, enhance or impart black cherry, grape, tropical fruit, sauted onion, garlic, cocoa, cabbage-like or hydrolyzed vegetable protein-like aroma or taste nuances to black cherry, grape, tropical fruit, sauted onion, spice, garlic, vegetable and hydrolyzed vegetable protein flavored foodstuffs, chewing gums, toothpastes and medicinal products.

The dithioethers of 2-phenyl-2-alkenals of our invention may be produced by means of reacting methyl mercaptan with at least one aldehyde defined according to the structure:

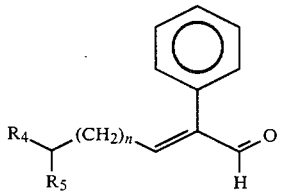

wherein N represents 0 or 1 and each of $R_4$ and $R_5$ represent hydrogen or methyl according to the reaction:

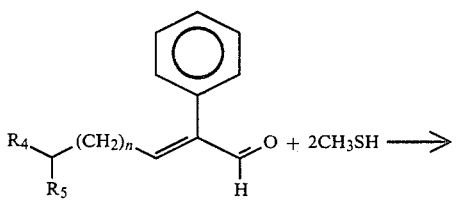

This reaction also causes the production of other methylthio disubstituted phenyl alkenes defined according to the structure:

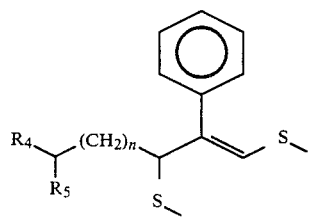

wherein N represents 0 or 1 and $R_4$ and $R_5$ each represent hydrogen or methyl. In a number of cases, the product having the structure:

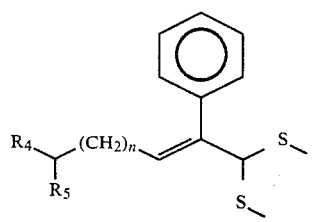

cannot be separated from the product having the structure:

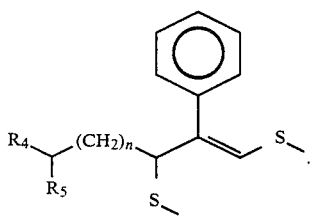

In other cases, the product having the structure:

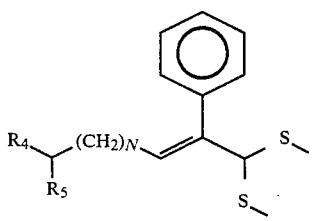

may be separated from the product having the structure:

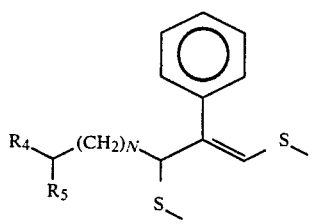

by means of preparative GLC.

The reaction of methyl mercaptan with the aldehyde having the structure:

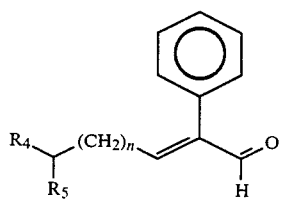

according to the reaction:

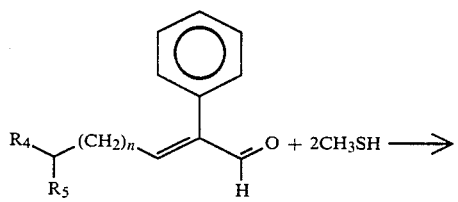

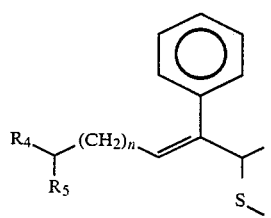

takes place in the presence of a protonic acid catalyst such as paratoluene sulfonic acid, xylene sulfonic acid, methane sulfonic acid, phosphoric acid and concentrated sulfuric acid. The reaction takes place in the presence of a solvent such as methylene chloride or cyclohexane over a period of time between about 8 hours and about 24 hours at atmospheric pressure. The reaction temperature may vary from between about 0° C. up to about 20° C. Reaction temperatures greater than 20° C. give rise to unnecessary breakdown of reaction product. Reaction temperatures less than 0° C. give rise to too long a period of time of reaction. The solvents utilized must be inert to the reaction product as well as inert to the reactants. The reaction solvent must also be capable of being completely removed from the product on distillation in view of the fact that the reaction products are used as food flavors for internal consumption.

Examples of the products of our invention and their organoleptic properties are as follows:

TABLE I

| Structure of Compound or Compounds | Organoleptic Properties |
| --- | --- |
| The compound having the structure:<br><br>prepared according to Example II. | A blackberry, grape, tropical fruit and sulfury aroma and taste profile at 2 ppm causing it to be useful in blackcherry, grape and tropical fruit-flavored foodstuffs. |
| The 90:10 (mole ratio) mixture of compounds having the structures:<br><br>and<br><br>prepared according to Example I. | A sauted onion, garlic and cocoa aroma and taste profile at 2 ppm causing the resulting mixture to be useful in sauted onion, spice and garlic flavored foodstuffs. |
| The 4:6 (mole ratio) mixture of compounds having the structures:<br><br>and<br><br>prepared according to Example III. | A cabbage, sulfury and hydrolyzed vegetable protein-like aroma and taste profile at 0.2 ppm causing the resulting mixture to be useful in vegetable and hydrolyzed vegetable protein-like flavored foodstuffs. |

At the end of the reaction as stated, supra, the reaction product is extracted from the reaction mass where the reaction mass is washed, for example, with saturated sodium chloride. The reaction product is then distilled preferably by means of vacuum distillation.

Thus, the dithioethers of 2-phenyl-2-alkenals of our invention produced according to our invention can be used to alter, vary, fortify, modify, enhance or otherwise improve the organoleptic properties including flavor and/or aroma of a wide variety of materials which are ingested, consumed or otherwise organoleptically sensed.

The term "alter" in its various forms will be understood herein to mean the supplying or imparting a flavor character or note to an otherwise bland, relatively tasteless substance, or augmenting an existing flavor characteristic where the natural flavor is deficient is some regard, or supplementing the existing flavor or aroma impression to modify the organoleptic character. The materials which are so altered are generally referred to herein as consumable materials.

Such dithioethers of 2-phenyl-2-alkenals of our invention are accordingly useful in flavoring compositions. Flavoring compositions are hereintaken to mean those which contribute a part of the overall flavor impression by supplementing or fortifying a natural or artificial flavor in a material, as well as those which supply substantially all the flavor and/or aroma character to a consumable article.

The term "foodstuff" as used herein includes both solid and liquid ingestible materials for man or animals, which materials usually do, but need not, have nutritional value. Thus, foodstuffs includes meats, gravies, soups, convenience foods, malt and other alcoholic or non-alcoholic beverages, milk and dairy products, nut butters such as peanut butter and other spreads, seafoods including fish, crustaceans, mollusks and the like, candies, breakfast foods, baked goods, vegetables, cereals, soft drinks, snack foods, dog and cat foods, other veterinary products, and the like.

When the dithioethers of 2-phenyl-2-alkenals according to this invention are used in food flavoring composition, they can be combined with conventional flavoring materials or adjuvants. Such co-ingredients or flavoring adjuvants are well known in the art for such use and have been extensively described in the literature. Apart from the requirement that any such adjuvant material is ingestibly acceptable, and thus non-toxic or otherwise non-deleterious, conventional materials can be used and broadly include other flavor materials, vehicles, stabilizers, thickeners, surface active agents, conditioners and flavor intensifiers.

Examples of preferred co-flavoring adjuvants are:
Methyl thiazole alcohol (4-methyl-5-betahydroxyethyl thiazole);
2-Methyl butanethiol;
4-Mercapto-2-butanone;
3-Mercapto-2-pentanone;
1-Mercapto-2-propanone;
Benzaldehyde;
Furfural;
Furfuryl alcohol;
2-Mercapto propionic acid;
Alkyl pyrazine;
Methyl pyrazine;
2-Ethyl-3-methyl pyrazine;
Tetramethyl pyrazine;
Polysulfides;
Dipropyl disulfide;
Methyl benzyl disulfide;
Alkyl thiophenes;
2-Butyl thiophene;
2,3-Dimethyl thiophene;
5-Methyl furfural;
Acetyl furan;
2,4-Decadienal;
Guiacol;
Phenyl acetaldehyde;
δ-Decalactone;
d-Limonene;
Acetoin;
Amyl acetate;
Maltol;
Ethyl butyrate;
Levulinic acid;
Piperonal;
Ethyl acetate;
n-Octanal;
n-Pentanal;
Hexanal;
Diacetyl;
Monosodium glutamate;
Monopotassium glutamate;
Sulphur-containing amino acids, e.g., cysteine;
Hydrolyzed vegetable protein;
2-Methylfuran-3-thiol;
2-Methyldihydrofuran-3-thiol;
2,5-dimethylfuran-3-thiol;
Hydrolyzed fish protein;
Methyl-2-propenyl disulfide;
Methyl-2-propenyl trisulfide;
Allyl methyl disulfide;
Allyl methyl trisulfide;
Dipropyl trisulfide;
3-Phenyl-4-pentenal;
5-Methyl-2-phenyl-2-hexenal;
2-(2,6-Dimethyl-1,5-heptadienyl)-4,5-dimethyl-1,3-dithiolane;
2-(2,6-Dimethyl-1,5heptadienyl)-4-methyl-1,3-dithiolane;
p-Hydroxybenzyl acetone;
Geraniol;
Cassia Oil;
Acetaldehyde;
Ethyl methyl phenyl glycidate;
Benzyl acetate;
Dimethyl sulfide;
Eugenol;
Vanillin;
Caryophyllene;
Ethyl pelargonate;
Cinnamaldehyde;
Methyl Anthranilate;
Isoamyl acetate;
Isobutyl acetate;
Cuminaldehyde;
Alpha ionone;
Cinnamyl formate;
Methyl cinnamate;
Acetic acid;
γ-Undecalactone;
Naphthyl ethyl ether;
Furfural;
Anethole;
2,3-Dimethyl pyrazine;
2-Phenyl-2-hexenal;

2-Phenyl-2-pentenal;
3-Phenyl-4-pentenal diethyl acetal;
γ-Terpinene;
δ-Carene;
Isopropyl-bicycloheptane;
Trans-Caryophyllene;
Humulene;
Nerol;
n-Tetradecanal;
Hexadecanal;
2-Methylheptadecane;
9-n-Octylheptadecane;
2,6,10,14-Tetramethylhexadecane;
2,6,11,15-Tetramethylhexadecane;
9-Heptadecanone;
2,6,10-15-Tetramethylheptadecane;
β-Damascone(1-crotonyl-2,6,6-trimethylcyclohex-1-ene);
β-Damascenone(1-crotonyl-2,6,6-trimethylcyclohexa-1,3-diene);
β-Cyclohomocitral(2,6,6-trimethylcyclohex-1-ene carboxaldehyde);
Isoamyl butyrate;
Cis-3-hexanol-1;
2-Methyl-2-pentenoic acid;
Elemecine(4-allyl-1,2,6-trimethoxybenzene);
isoelemecine(4-propenyl-1,2,6-trimethoxybenzene);
2-(4-Hydroxy-4-methylpentyl)norbornadiene;
2-Methyl-3-furanthio;
4-(Methylthio)butanal;
Ethyl-4-(methylthio)butyrate;
4-(Methylthio)butanal;
2,5-Dimethyl-3-furan-thio acetate;
2-Methyl-3-furan-thio isobutyrate;
Reaction product of hydrogen sulfide and maltol; and
Reaction product of hydrogen sulfide and ethyl maltol.

The dithioethers of 2-phenyl-2-alkenals or compositions incorporating them, as mentioned above can be combined with one or more vehicles or carriers for adding them to the particular product. Vehicles can be edible or otherwise suitable materials such as ethyl alcohol, propylene glycol, water and the like. Carriers include materials such as gum arabic, carrageenan, other gums and the like. The dithioethers of 2-phenyl-2-alkenals according to this invention can be incorporated with the carriers by conventional means such as spray-drying, drum-drying and the like. Such carriers can also include for coacervating the dithioethers of 2-phenyl-2-alkenals of our invention (and other flavoring ingredients, as present) to provide encapsulated products. When the carrier is an emulsion, the flavoring composition can also contain emulsifiers such as mono- and diglycerides or fatty acids and the like. With these carriers or vehicles, the desired physical form of the composition can be prepared.

The quantity of dithioethers of 2-phenyl-2-alkenals of our invention utilized should be sufficient to impart the desired flavor characteristics to the product, but on the other hand, the use of an excessive amount of the derivative is not only wasteful and uneconomical, but in some instances too large a quantity may unbalance the flavor or other organoleptic properties of the product consumed. The quantity used will vary depending upon the ultimate foodstuff; the amount and type of flavor initially present in the foodstuff; the further process or treatment steps to which the foodstuff will be subjected; regional and other preference factors; the type of storage, if any, to which the product will be subject; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff.

It is accordingly preferred that the ultimate composition contain from about 0.1 parts per million up to about 250 parts per million of dithioethers of 2-phenyl-2-alkenals of our invention or mixtures thereof. More particularly, in food compositions it is desirable to use from about 0.1 to 100 parts per million for enhancing flavors and in certain preferred embodiments of the invention, from about 0.1 to about 10 parts per million of the methyl substituted dithioethers of 2-phenyl-2-alkenals of our invention are included to add positive flavors to the finished product.

The amount of dithioethers of 2-phenyl-2-alkenals or mixtures thereof of our invention to be utilized in flavoring compositions can be varied over a wide range depending upon the particular quality to be added to the foodstuff. Thus, amounts of one or more derivatives according to the present invention of from about 0.5 ppm up to 80 or 90% of the total flavoring composition can be incorporated in such compositions. It is generally found to be desirable to include from about 1 ppm up to about 0.1% of the dithioethers of 2-phenyl-2-alkenals in such compositions.

The following examples are given to illustrate embodiments of the invention as it is preferred to practice it. It will be understood that these examples are illustrative and the invention is not to be considered restricted thereto except as indicated in the appended claims.

All parts, proportions, percentages and ratios used herein are by weight unless otherwise indicated.

EXAMPLE I

PREPARATION OF DIMETHYL MERCAPTAL OF 5-METHYL-2-PHENYL-2-HEXENAL

Reaction:

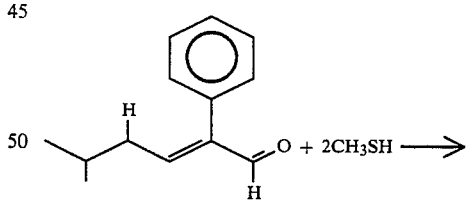

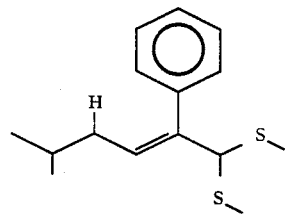

Into a 1 liter reaction flask equipped with stirrer, thermometer, reflux condenser and isopropanol cooling bath and gas bubbler is placed 1 gram of paratoluene sulfonic acid; 300 ml methylene chloride; and 188 grams of 2-phenyl-5-methyl-2-hexenal having the structure:

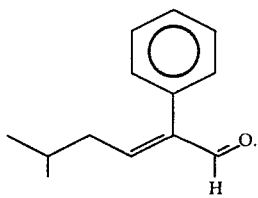

The reaction mass is cooled, with stirring, to a temperature of between 0° and 10° C. While maintaining the reaction mass at between 0° and 10° C., 144 grams of methyl mercaptan is bubbled into the reaction flask over a period of 8 hours. At the end of the 8 hour period, the reaction mass is stirred for a period of 3 hours at 25° C. The reaction mass is then washed with two volumes of 10% aqueous sodium bicarbonate followed by two 300 ml volumes of water. The reaction mass is then dried over anhydrous sodium sulfate and the solvent is stripped from the reaction mass from 10° C. at 200 mm/Hg. pressure up to 60° C. at 3–8 mm/Hg. pressure.

The resulting reaction product contains 9:1 (mole ratio) mixture of the compound having the structure:

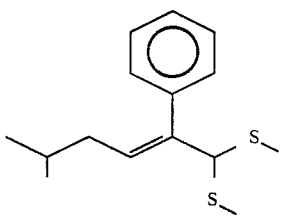

to the compound having the structure:

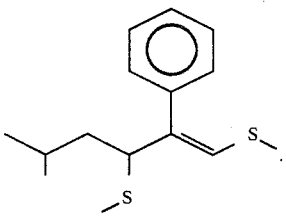

FIG. 1 is the GLC profile for the crude reaction product.

FIG. 2 is the NMR spectrum for the peak indicated in FIG. 1, for the compounds having the structures:

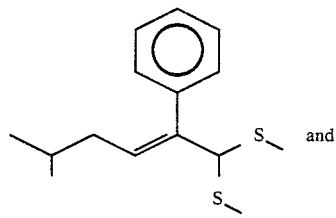

(Conditions: Field strength: 100 MHz; Solvent: CFCl₃).

The resulting product has a sauted onion, garlic and cocoa aroma and taste profile at 2 ppm causing it to be useful in sauted onion, spice and garlic flavored foodstuffs.

EXAMPLE II

PREPARATION OF DIMETHYL MERCAPTAL OF 4-METHYL-2-PHENYL-2-PENTENAL

Reaction:

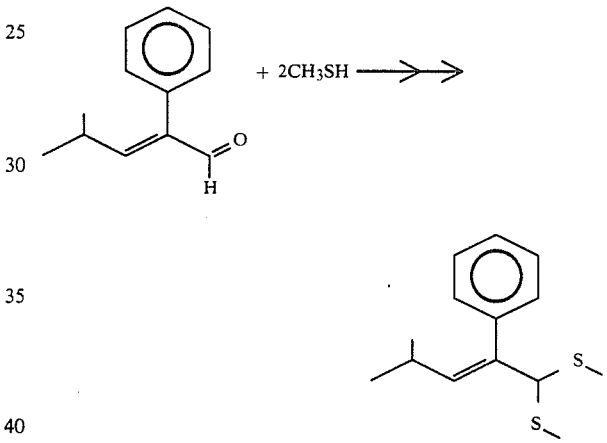

Into a 500 cc reaction flask equipped with stirrer, thermometer, reflux condenser and isopropyl alcohol cooling bath is placed 200 ml cyclohexane; 0.5 grams paratoluene sulfonic acid and 25 grams of the aldehyde having the structure:

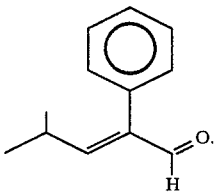

With stirring, the reaction mass is cooled to 0° C. Over a period of 10 hours, while maintaining the reaction mass at 0°–5° C., 20 grams of methyl mercaptan is bubbled into the reaction mass with stirring.

At the end of the 10 hour period, the reaction mass is washed with two volumes of 10% aqueous sodium bicarbonate followed by two 300 ml volumes of water. The reaction mass is then dried over anhydrous sodium sulfate and distilled.

The resulting product contains two compounds, the first having the structure:

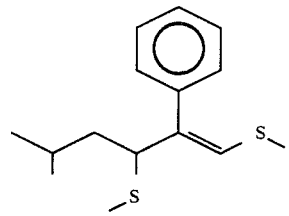

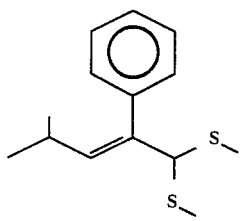

and the second having the structure:

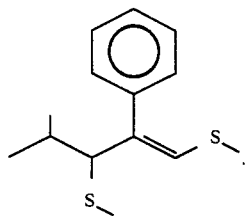

The resulting mixture is then divided into its respective components using preparative GLC. The component having the structure:

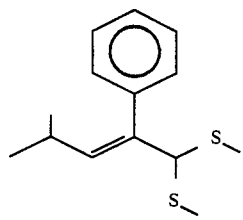

has an aesthetically pleasing black cherry, grape, tropical fruit and sulfury aroma and taste profile at 2 ppm thereby causing it to be useful in black cherry, grape and tropical fruit flavored foodstuffs.

FIG. 3 is the NMR spectrum for the compound having the structure:

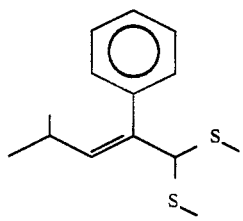

(Conditions: Field strength: 100 MHz; Solvent: CFCl₃).

FIG. 4 is the NMR spectrum for the compound having the structure:

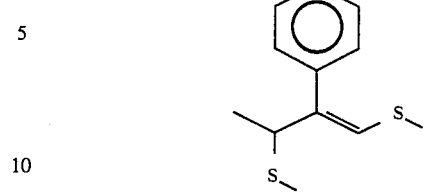

produced according to Example II. (Conditions: Field strength: 100 MHz; Solvent: CFCl₃).

EXAMPLE III

PREPARATION OF A MIXTURE OF THE DIMETHYL MERCAPTAL OF 2-PHENYL-2-BUTENAL AND 1,3-DIMETHYLTHIO-2-PHENYL-1-BUTENE AND SEPARATE COMPONENTS THEREOF

Reaction:

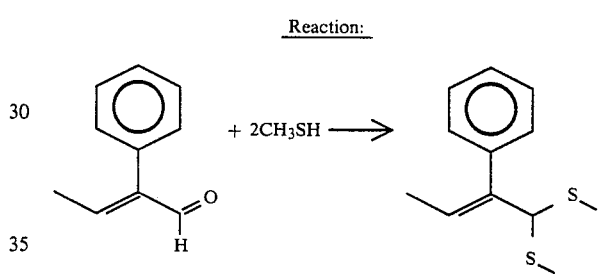

Into a 500 cc reaction flask equipped with stirrer, thermometer, reflux condenser and isopropyl alcohol cooling bath is placed 200 ml cyclohexane; 0.5 grams paratoluene sulfonic acid and 25 grams of the compound having the structure:

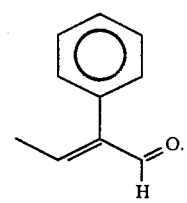

With stirring the reaction mass is cooled to 10° C. Over an 8 hour period, 25 grams of methyl mercaptan is bubbled into the reaction mass with stirring. At the end of the 8 hour period, the reaction mass is washed with two volumes of 10% sodium bicarbonate solution followed by two volumes (300 ml each) of water. The reaction mass is then dried over anhydrous sodium sulfate and fractionally distilled. The resulting distillation fraction contains 40 mole percent of the compound having the structure:

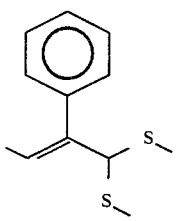

and 60 mole percent of the compound having the structure:

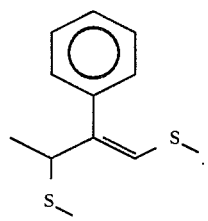

These compounds are separated by means of preparative GLC fractionation.

The resulting mixture (40%) of the compound having the structure:

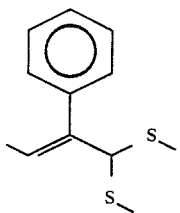

and (60%) of the compound having the structure:

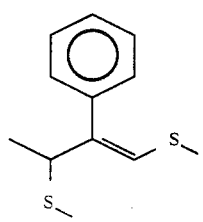

has an excellent cabbage, sulfury and hydrolyzed vegetable protein-like aroma and taste profile at 0.2 ppm causing it to be useful in vegetable and hydrolyzed vegetable protein flavored foodstuffs.

FIG. 5 is the NMR spectrum for the compound having the structure:

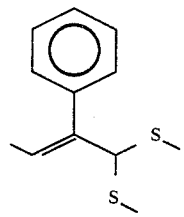

(Conditions: Field strength: 100 MHz; Solvent: CFCl$_3$).

FIG. 6 is the NMR spectrum for the compound having the structure:

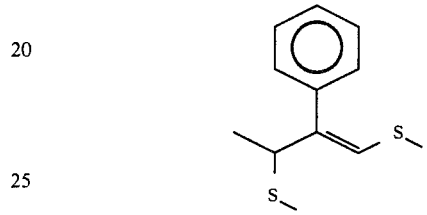

(Conditions: Field strength: 100 MHz; Solvent: CFCl$_3$).

EXAMPLE IV

BEVERAGE

Goya Products Inc. Mango Nectar is flavored at a level of 2 ppm with the compound having the structure:

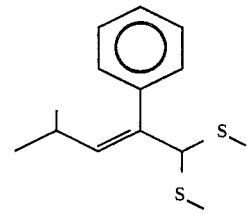

prepared according to Example II. The resulting mango nectar has a much more natural-like, freshly picked mango nuance unlike standard mango nectar, with black cherry and grape nuances. When the compound having the structure:

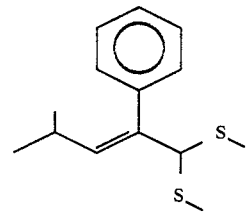

is replaced with a 2:8 (mole:mole) mixture of oxathiane having the structure:

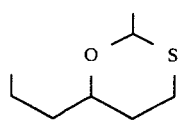

in admixture with the compound having the structure:

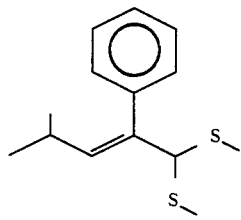

a more intense fresh note with the same natural mango aroma and taste nuances are present.

EXAMPLE V
MANGO FLAVOR

The following flavor formulation is prepared:

| Ingredients | Parts by Weight |
|---|---|
| The compound having the structure: 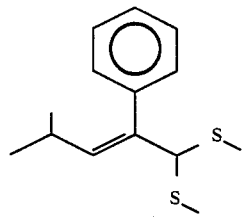 | 12.0 |
| γ-Terpinene | 14.0 |
| δ-Carene | 32.0 |
| Isopropyl-bicycloheptane | 18.0 |
| Trans-Caryophyllene | 28.0 |
| Humulene | 22.4 |
| Nerol | 18.0 |
| Tetradecanol | 4.0 |
| Hexadecanol | 14.0 |
| 2-Methylheptadecane | 82.0 |
| 9-n-Octylheptadecane | 50.0 |
| 2,6,10,14-Tetramethylhexadecane | 24.0 |
| 2,6,11,15-Tetramethylhexadecane | 21.0 |
| 9-Heptadecanone | 14.0 |
| 2,6,10,15-Tetramethylheptadecane | 4.0 |
| Trans,trans,δ-damascone | 2.0 |

The compound defined according to the structure:

imparts a fresh, natural black cherry and grape nuance to this mango flavor. The resulting mango flavor without the compound having the structure:

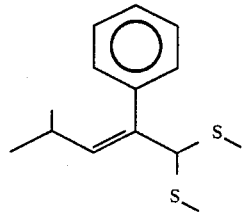

has very bland standard "canned fruit" taste and aroma and does not have the natural intense fresh character that the formulation has with the use of the compound having the structure:

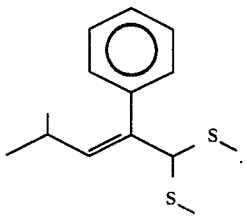

EXAMPLE VI

The mango flavor composition as set forth in Example V is added at the rate of 0.2% to various foodstuffs with and without the compound having the structure:

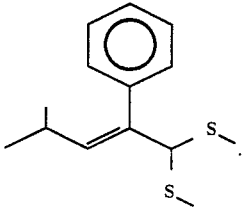

When it is added with the compound having the structure:

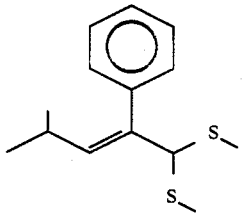

it is called the "test composition". When it is added without the chemical having the structure:

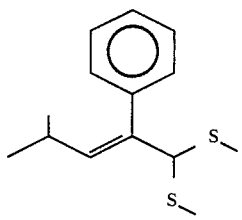

it is called the "control composition".

The test and control compositions are added to the food products described hereinafter in the proportions shown for 10 kilograms of material to be flavored:
Pudding: 5–10 grams (0.15–0.1%),
Cooked sugar: 15–20 grams (0.15–2%).
[Cooked sugar preparation: 100 ml of sugar syrup (prepared by dissolving 1 kilogram of sucrose in 600 ml of water) and 20 grams of glucose are mixed together and slowly heated to 145° C. The flavor is added and the mass is allowed to cool and harden.]
[Pudding preparation: To 500 ml of warmed milk are added with stirring a mixture of 60 grams sucrose and 3 grams of pectin. The mixture is boiled for a few seconds and the flavor is added. The mixture is allowed to cool.]

The finished foodstuff samples are tested by a panel of trained persons who express their views about the flavor of the samples. All members of the panel prefer the test samples having a more distinguished fresh mango aroma with black cherry and grape nuances.

EXAMPLE VII

A. Powder Flavor Composition

20 Grams of the flavor composition of Example V containing the compound having the structure:

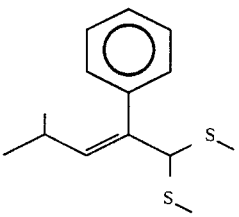

prepared according to Example II, is emulsified in a solution containing 300 grams of gum acacia and 700 grams water. The emulsion is spray-dried with a Bowen Lab Model Drier utilizing 260 c.f.m. of air with an inlet temperature of 500° F., and a wheel speed of 50,000 rpm.

B. Sustained Release Flavor

The following mixture is prepared:

| Ingredients | Parts by Weight |
| --- | --- |
| Liquid Mango Flavor of Example V | 20.00 |
| Propylene Glycol | 9.00 |
| CAB-O-SIL ® M-5: (Brand of silica produced by the Cabot Corporation of 125 High Street, Boston, Massachusetts 02112; | 5.00 |
| *-continued* | |
| Ingredients | Parts by Weight |
| Physical Properties: | |
| Surface area: 200 $M^2$/gm Nominal particle size: 0.012 microns Density: 2.3 lbs.)cu.ft.) | |

The Cab-O-Sil is dispersed in the liquid mango flavor composition of Example V, with vigorous stirring thereby resulting in a viscous liquid. 71 Parts by weight of the powder flavor composition of Part A, supra, is then blended into the said viscous liquid, with stirring at 25° C. for a period of thirty minutes resulting in a dry, free flowing sustained release mango flavor powder.

EXAMPLE VIII

10 Parts by weight of a 5- Bloom pigskin gelatin is added to 90 parts by weight of water at a temperature of 150° F. The mixture is agitated until the gelatin is completely dissolved and the solution is cooled to 120° F. 20 Parts by weight of the liquid mango flavor composition of Example V is added to the solution which is then homogenized to form an emulsion having a particle size typically in the range of 5–40 microns. This material is kept at 120° F. under which conditions the gelatin will not gel.

Coacervation is induced by adding, slowly and uniformly, 40 parts by weight of a B 20% aqueous solution of sodium sulfate. During coacervation the gelatin molecules are deposited uniformly about each oil droplet as a nucleus.

Gelation is effected by pouring the heated coacervate mixture into 1,000 parts by weight of 7% aqueous solution of sodium sulfate at 65° F. The resulting gelled coacervate may be filtered and washed with water at temperatures below the melting point of gelatin, to remove the salt.

EXAMPLE IX

CHEWING GUM

100 Parts by weight of chicle are mixed with 4 parts by weight of the flavor prepared in accordance with Example VII(B). 300 Parts of sucrose and 100 parts of corn syrup are added. Mixing is effected in a ribbon blender with jacketed side walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long lasting mango flavor.

EXAMPLE X

CHEWING GUM

100 Parts by weight of chicle are mixed with 18 parts by weight of the flavor prepared in accordance with Example VIII. 300 Parts of sucrose and 100 parts of corn syrup are added. Mixing is effected in a ribbon blender with jacketed walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long lasting mango flavor.

EXAMPLE XI

TOOTHPASTE FORMULATION

The following separate groups of ingredients are prepared:

| Parts by Weight | Ingredients |
|---|---|
| GROUP "A" | |
| 30.200 | Glycerine |
| 15.325 | Distilled Water |
| .100 | Sodium Benzoate |
| .125 | Saccharin Sodium |
| .400 | Stannous Fluoride |
| GROUP "B" | |
| 12.500 | Calcium Carbonate |
| 37.200 | Dicalcium Phosphate (Dihydrate) |
| GROUP "C" | |
| 2.000 | Sodium n-Lauroyl Sarcosinate (foaming agent) |
| GROUP "D" | |
| 1.200 | Flavor Material of Example VII (B) |
| 100.00 (Total) | |

Procedure:
1. The ingredients in Group "A" are stirred and heated in a steam jacketed kettle to 160° F.
2. Stirring is continued for an additional three to five minutes to form a homogeneous gel.
3. The powders of Group "B" are added to the gel, while mixing, until a homogeneous paste is formed.
4. With stirring, the flavor of Group "D" is added and lastly the sodium n-lauroyl sarcosinate.
5. The resultant slurry is then blended for one hour. The completed paste is then transferred to a three roller mill and then homogenized, and finally tubed.

The resulting toothpaste, when used in a normal toothbrushing procedure yields a pleasant mango flavor, of constant strong intensity throughout said procedure (1–1.5 minutes).

EXAMPLE XII

CHEWABLE VITAMIN TABLETS

The flavor material produced according to the process of Example VII(B) is added to a Chewable Vitamin Tablet Formulation at the rate of 10 grams/kilogram which chewable vitamin tablet formulation is prepared as follows:

In a Hobart Mixer the following materials are blended to homogeneity:

| | Gms/ 1000 tablets |
|---|---|
| Vitamin C (ascorbic acid) as ascorbic acid-sodium ascorbate mixture 1:1 | 70.00 |
| Vitamin $B_1$ (thiamine mononitrate) as Rocoat ® thiamine mononitrate 33⅓% (Hoffman LaRoche) | 4.0 |
| Vitamin $B_2$ (riboflavin) as Rocoat ® riboflavin 33⅓% | 5.0 |
| Vitamin B (pyridoxine hydrochloride) as Rocoat ® pyridoxine hydrochloride 33⅓% | 4.0 |
| Niacinamide as Rocoat ® niacinamide 33⅓% | 33.0 |
| Calcium pantothenate | 11.5 |
| Vitamin $B_{12}$ (cyanocobalamin) as Merck 0.1% in gelatin | 3.5 |
| Vitamin E (dl-α-tocopheryl acetate as dry vitamin E acetate 33⅓% | 6.6 |
| Roche b-biotin | |
| Flavor of Example VII (B) | 0.004 (as indicated above) |
| Certified lake color | 5.0 |
| Sweetener - sodium saccharin | 1.0 |
| Magnesium stearate lubricant | 10.0 |
| Mannitol q.s. to make | 500.0 |

Preliminary tablets are prepared by slugging with flat-faced punches and grinding the slugs to 14 mesh. 13.5 g. Dry Vitamin A Acetate and 0.6 g Vitamin D are then added as beadlets. The entire blend is then compressed using concave punches at 0.5 g each.

Chewing of the resultant tablets yields a pleasant, long-lasting, consistenly strong mango flavor for a period of 12 minutes.

EXAMPLE XIII

The 9:1 (mole ratio) mixture of compounds having the structures:

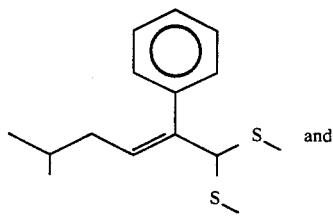

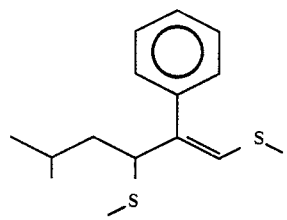

prepared according to Example I is dissolved in propylene glycol to provide a 0.1% solution. This solution is added to 7.3 grams of a soup base (in order to yield a level of 2 ppm of the mixture of compounds having the structures:

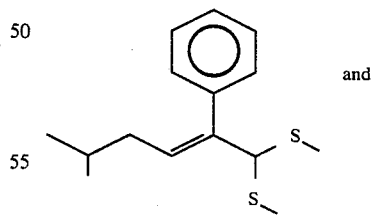

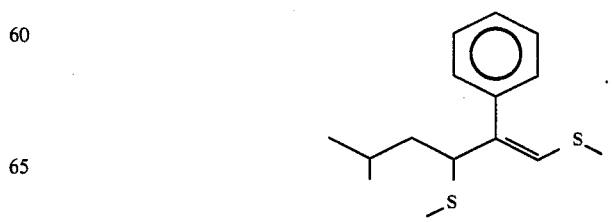

The soup base consists of:

| Ingredient | Parts by Weight |
|---|---|
| Fine ground sodium chloride | 35.5 |
| Hydrolyzed vegetable protein | 27.5 |
| Monosodium glutamate | 18.0 |
| Sucrose | 11.0 |
| Beef fat | 5.5 |
| Sethness caramel color (powder B & C) | 2.7 |

The resulting beef broth flavor has a garlic, sauted onion aroma and taste profile. The mixture of compounds having the structures:

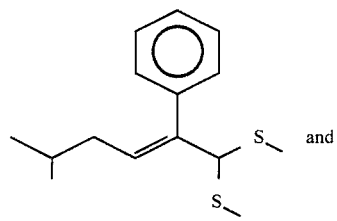

causes the flavor to be intensified by approximately 25% and imparts thereto a sauted onion and garlic aroma and taste which renders the broth much more aesthetically pleasing than without the mixture of compounds having the structures:

The mixture of compounds having the structures:

(9:1 mole ratio) is considered by a bench panel of four independent individuals (not associated with the assignee of the instant application) to be superior in all respects to the beef broth not containing the mixture of compounds having the structures:

EXAMPLE XIV

The 4:6 (mole ratio) mixture of compounds having the structures:

prepared according to Example III is added to a 2% solution of Wyler's "Beef Flavored Instant Bouillon" (manufactured by the Wyler Foods, Division of Borden, Inc., Chicago, Ill., U.S.A.):

(Ingredients: Salt, hydrolyzed vegetable protein, malto dextrin,, sugar beef fat, water, monosodium glutamate, flavorings, corn sugar, beef extract, caramel color, hydrogenated vegetable fat and U.S. certified color)
at the rate of 0.2 ppm. The resulting beef flavored broth has an excellent cabbage and hydrolyzed vegetable protein-like flavor and aroma nuance causing it to be closely akin to "sweet and sour" soup.

What is claimed is:

1. A process for augmenting or enhancing the aroma or taste of a foodstuff comprising the step of adding to said foodstuff about 0.1 parts per million up to about 250 parts per million of the compound having the structure:

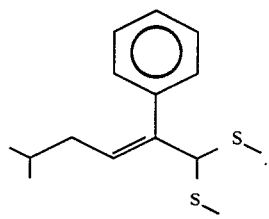

2. A process for augmenting or enhancing the aroma or taste of a foodstuff comprising the step of adding to said foodstuff 0.1 parts per million up to about 250 parts per million of a 90:10 mixture of compounds having the structures:

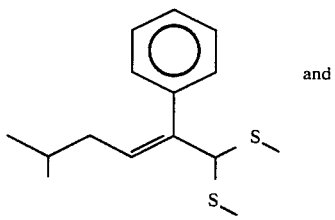

and

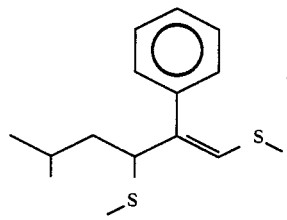

3. A product for augmenting or enhancing the aroma or taste of a foodstuff comprising the step of adding the said foodstuff 0.1 parts per million up to about 250 parts per million of a 4:6 mixture of compounds having the structures:

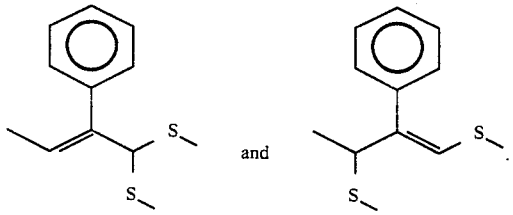

* * * * *